US008004964B2

(12) United States Patent
Boutros et al.

(10) Patent No.: US 8,004,964 B2
(45) Date of Patent: Aug. 23, 2011

(54) RESTORING MULTI-SEGMENT PSEUDOWIRES FOLLOWING FAILURE OF A SWITCHING PE DEVICE

(75) Inventors: Sami Boutros, San Ramon, CA (US); Muthurajah Sivabalan, Kanata (CA); Luca Martini, Lakewood, CO (US); George Swallow, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 137 days.

(21) Appl. No.: 12/383,359

(22) Filed: Mar. 23, 2009

(65) Prior Publication Data

US 2010/0238795 A1  Sep. 23, 2010

(51) Int. Cl.
    *G01R 31/08* (2006.01)
(52) U.S. Cl. ........................ 370/219; 370/400
(58) Field of Classification Search .......... 370/248, 370/252, 389, 241, 255, 228, 217–221, 244–245, 370/250–251, 323–327, 352–356, 400–427, 370/395.2–395.21, 395.3; 709/249
    See application file for complete search history.

(56) References Cited

U.S. PATENT DOCUMENTS

| 7,343,423 | B2 | 3/2008 | Goguen et al. |
| 7,408,941 | B2 | 8/2008 | Martini et al. |
| 7,483,387 | B2 | 1/2009 | Guichard et al. |
| 2005/0044262 | A1 | 2/2005 | Luo |
| 2005/0097219 | A1 | 5/2005 | Goguen et al. |
| 2006/0045028 | A1 | 3/2006 | Hasan et al. |
| 2006/0047851 | A1 | 3/2006 | Voit et al. |
| 2006/0146832 | A1 | 7/2006 | Rampal et al. |
| 2006/0215548 | A1 | 9/2006 | Le Faucheur et al. |
| 2006/0245436 | A1 | 11/2006 | Sajassi |
| 2007/0008982 | A1 | 1/2007 | Voit et al. |
| 2008/0089227 | A1 | 4/2008 | Guichard et al. |
| 2008/0095061 | A1* | 4/2008 | Hua et al. ............ 370/248 |
| 2008/0225864 | A1* | 9/2008 | Aissaoui et al. ........ 370/401 |
| 2009/0059800 | A1* | 3/2009 | Mohan ............. 370/241.1 |
| 2010/0157793 | A1* | 6/2010 | Sajassi et al. .......... 370/228 |

* cited by examiner

*Primary Examiner* — Ricky Ngo
*Assistant Examiner* — Iqbal Zaidi
(74) *Attorney, Agent, or Firm* — Cesari and McKenna, LLP

(57) ABSTRACT

In one embodiment, a protected switching provider edge (S-PE) and a backup S-PE may be operated, where the protected S-PE has at least one multi-segment pseudowire (MS-PW) and is between a first and second provider edge (PE) on the MS-PW. To protect the protected S-PE, the first and second PE may be informed of the backup S-PE and a backup label to reach the second and first PE, respectively, via the backup S-PE to remain on the MS-PW. Upon detecting loss of connectivity with the protected S-PE, the first and/or second PE may forward packets of the MS-PW to the backup S-PE with the corresponding backup label to reach the second or first PE, respectively, on the MS-PW.

18 Claims, 8 Drawing Sheets

INCOMING LABEL MAP (ILM) TABLE (AT S-PE 2) 800

| MS-PW 820 | DIRECTION 830 | | INCOMING LABEL 840 | OUTGOING LABEL 850 | TRANSPORT LABEL 860 |
|---|---|---|---|---|---|
| CONTEXT LABEL 810 | | ⇒ | | | |
| MS-PW 1 | T-PE 1 ⇒ S-PE 3 | ⇒ | "A" | "W" | "S-PE 3" |
| MS-PW 1 | S-PE 3 ⇒ T-PE 1 | ⇒ | "B" | "X" | "T-PE 1" |
| MS-PW 2 | T-PE 1 ⇒ S-PE 3 | ⇒ | "C" | "Y" | "S-PE 3" |
| MS-PW 2 | S-PE 3 ⇒ T-PE 1 | ⇒ | "D" | "Z" | "T-PE 1" |
| ... | ... | ⇒ | ... | ... | ... |

ENTRIES 870

FIG. 8

RESTORING MULTI-SEGMENT PSEUDOWIRES FOLLOWING FAILURE OF A SWITCHING PE DEVICE

TECHNICAL FIELD

The present disclosure relates generally to computer networks, and, more particularly, to pseudowire technology.

BACKGROUND

As Service Providers (SPs) begin to carry real-time traffic such as voice and video over Pseudowires (PWs) (e.g., multi-segment PWs, or "MS-PWs"), the requirement to minimize traffic loss due to PW failure becomes more and more stringent. Accordingly, it is desired to have enhanced PW redundancy mechanisms that can achieve rapid switchover in the event of a failure of a switching provider edge (PE) device.

BRIEF DESCRIPTION OF THE DRAWINGS

The advantages of the invention may be better understood by referring to the following description in conjunction with the accompanying drawings in which like reference numerals indicate identically or functionally similar elements, of which:

FIG. 8 illustrates an example incoming label map (ILM) table.

DESCRIPTION OF EXAMPLE EMBODIMENTS

Overview

According to one or more embodiments of the disclosure, a protected switching provider edge (S-PE) and a backup S-PE may be operated, where the protected S-PE has at least one multi-segment pseudowire (MS-PW) and is between a first and second provider edge (PE) on the MS-PW. To protect the protected S-PE, the first and second PE may be informed of the backup S-PE and a "backup label" to reach the second and first PE, respectively, via the backup S-PE to remain on the MS-PW. For example, the backup label may be i) a label to reach the opposing PE and the label that opposing PE expects for the MS-PW, ii) an allocated label of the backup S-PE, or iii) a context label for a lookup operation at the backup S-PE. Upon detecting loss of connectivity with the protected S-PE, the first and/or second PE may forward packets of the MS-PW to the backup S-PE with the corresponding "backup label" to reach the second or first PE, respectively, on the MS-PW.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
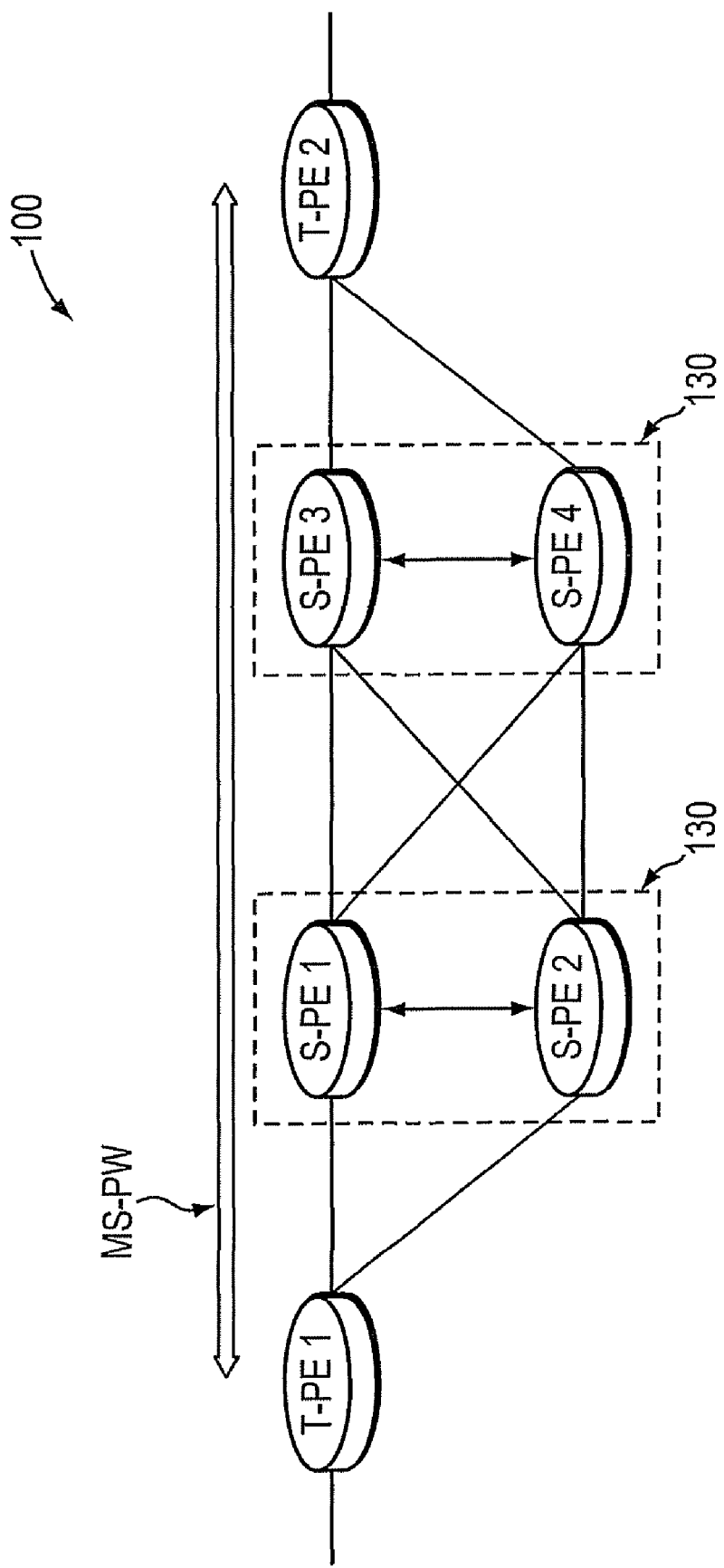
FIG. 1 illustrates an example computer network.

FIG. 1 is a schematic block diagram of an example computer network 100 illustratively comprising nodes/devices, such as one or more provider edge (PE) devices, for example, terminating PEs (T-PEs) 1 and 2 interconnected by switching PEs (S-PEs) 1-4 with links as shown. Illustratively, the network 100 is configured to operate in accordance with multi-segment pseudowires (MS-PWs) through the network to interconnect the T-PEs via intermediate S-PEs, as will be understood by those skilled in the art. In addition, S-PEs may, though need not be, arranged in a chassis configuration, such as where S-PE 1 and S-PE 2 are physically located in a same chassis (130), and S-PE 3 and S-PE 4 are located in a same chassis (130). Generally, however, as described herein, a communicative relationship exists between S-PE 1 and S-PE 2 and between S-PE 3 and S-PE 4. Those skilled in the art will understand that any number of nodes, devices, links, etc. may be used in the computer network, and that the view shown herein is for simplicity.

Figure 2:
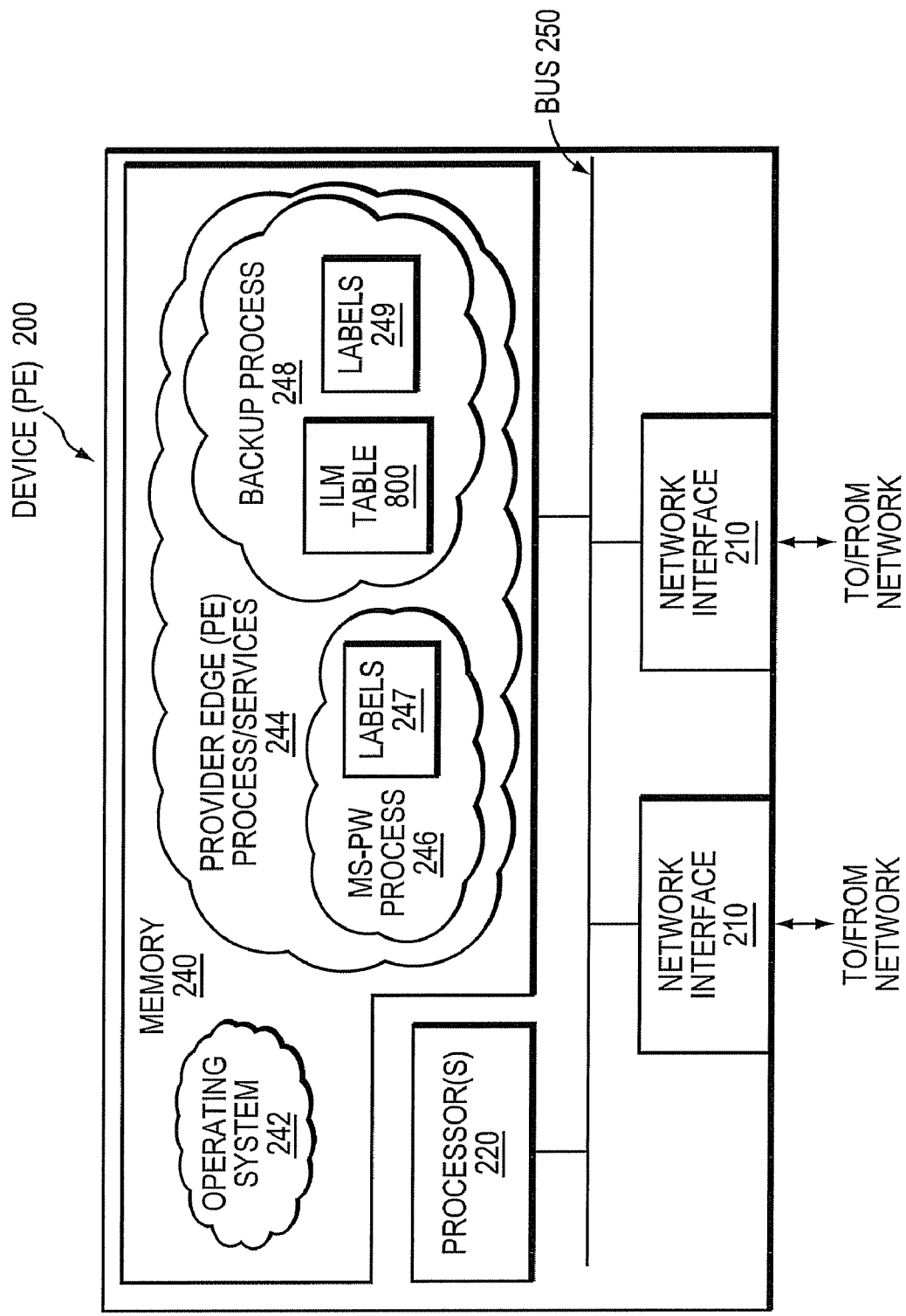
FIG. 2 illustrates an example network device.

FIG. 2 is a schematic block diagram of an example node/device 200 that may be advantageously used with one or more embodiments described herein, e.g., as a PE device (T-PE or S-PE). The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, MPLS, IP, UDP, etc., and particularly communication protocols to implement multi-segment pseudowires (MS-PWs), as may be appreciated by those skilled in the art. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic configured to execute the software programs and manipulate the data structures, such as an incoming label map (ILM) table 800, described below. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise a provider edge (PE) process 244, particularly an MS-PW process 246, and illustratively a backup process 248, as needed (e.g., depending upon the functionality of the device, as described herein). Further, labels 247/249 used in conjunction with MS-PW processing may be stored in the memory 240, and manipulated by various processes as described herein and as will be understood by those skilled in the art. It will also be apparent to those skilled in the art that other types of processors and memory, including various computer-readable media, may be used to store and execute program instructions pertaining to the inventive technique described herein.

PE process/services 244 contain computer executable instructions executed by processor 220 to perform functions related to operation as a PE (e.g., a T-PE or S-PE), particularly in accordance with multi-segment pseudowires (MS-PWs) and process 246. In particular, a network (e.g., a service provider or "SP" network) may include peripherally located Provider Edge (PE) routers/devices, each of which generally coupling to one or multiple Customer Edge (CE) routers/devices (not shown). The PE routers are used to maintain routing and forwarding context for each customer. The CE routers may couple to private LANs associated with one or multiple customers. The private LANs are frequently referred to as core networks. The PE routers learn local customer routes from the CE routers and distribute remote customer routes to the CE router. The PEs may use Border Gateway Protocol (BGP) to distribute customer routes to each other.

To support operation, an ingress PE can put a packet in a two-level Multi Protocol Label Switching (MPLS) stack. The top label is used to tunnel packets to the egress PE to accomplish MPLS forwarding through the core network. The bottom label is used by the egress PE to identify the outgoing route for the packet. In a typical networking environment used for routing data, the environment may include a number of Customer Edge (CE) routers, a number of Provider Edge (PE) routers and a packet-switched network (PSN). Data, encapsulated in layer-2 frames, may be forwarded from a first CE router to a first PE router, from the first PE router across the PSN to a second PE router, and from the second PE router to a second CE router.

In particular conventional systems, a PDU (e.g., a frame) traverses the networking environment beginning at a first CE router and ending up at a second CE router. The first CE router sends a layer-2 PDU to an ingress PE router. The ingress PE router receives the PDU and encapsulates the PDU with MPLS labels which are used to identify the individual port/circuit and the egress layer-3 PE router. The encapsulated PDU is then forwarded on the PW, across the packet-switched network, to an egress layer-3 PE router. The egress layer-3 PE router removes the MPLS label that identifies the port/circuit that was added by the ingress PE router and forwards the layer-2 PDU to the second CE router.

Pseudowires (PWs) are known in the art of computer networking and telecommunications. A pseudowire (PW) may be utilized to transfer data across the PSN. In general, a pseudowire is an emulation of the essential attributes of a telecommunications service over a Packet Switched Network (PSN). The service may be ATM, T1 leased line, Frame Relay, Ethernet, low-rate TDM, or SONET/SDH, for example. The PSN may be Multiprotocol Label Switching (MPLS), IP (either IPv4 or IPv6), or Layer 2 Tunnel Protocol Version 3 (L2TPv3). The functions provided by a PW includes encapsulating service-specific bit streams, cells, or PDUs arriving at an ingress port and carrying them across a path or tunnel, managing their timing and order, and any other operations required to emulate the behavior and characteristics of the particular service. Pseudowires can be used to carry ingress layer-2 traffic from an ingress PE router to an egress PE router, and then forward the layer-2 traffic out of an egress port of the egress PE router.

Multi-Segment Pseudowires (MS-PWs) are also known in the art. MS-PWs may transit more than one PSN domain and more than one PSN tunnel. MS-PWs have become necessary for the extension of network and transport services such as layer-2 and layer-3 technologies across domains. A domain refers to a collection of network elements within a common sphere of address management or path computational responsibility such as an IGP area, Autonomous System (AS), service provider area, or area with reduced routing state such as is the case with Route Summarization in effect. Multiple pseudowire segments (i.e., single-hop pseudowires) are stitched together to create a single end-to-end multi-segment pseudowire (i.e., a multi-hop pseudowire) from the source of the pseudowire (a terminating PE, "T-PE") to the destination of the pseudowire (another T-PE), e.g., sometimes via one or more switching PEs (S-PEs).

As noted above, as Service Providers (SPs) begin to carry real-time traffic such as voice and video over MS-PWs, the requirement to minimize traffic loss due to PW failure becomes more and more stringent. Accordingly, it is desired to have enhanced PW redundancy mechanisms that can achieve rapid switchover in the event of a failure of a switching provider edge (PE) device.

According to one or more embodiments of the disclosure, therefore, a protected switching provider edge (S-PE) and a backup S-PE may be operated, where the protected S-PE has at least one multi-segment pseudowire (MS-PW) and is between a first and second provider edge (PE) on the MS-PW. To protect the protected S-PE, the first and second PE may be informed of the backup S-PE and a "backup label" to reach the second and first PE, respectively, via the backup S-PE to remain on the MS-PW. For example, the backup label may be i) a label to reach the opposing PE and the label that opposing PE expects for the MS-PW, ii) an allocated label of the backup S-PE, or iii) a context label for a lookup operation at the backup S-PE. Upon detecting loss of connectivity with the protected S-PE, the first and/or second PE may forward packets of the MS-PW to the backup S-PE with the corresponding "backup label" to reach the second or first PE, respectively, on the MS-PW.

Illustratively, the techniques described herein may be performed by hardware, software, and/or firmware, such as in accordance with a provider edge (PE) process 244 and particularly, an MS-PW process 246 and where applicable, a backup process 248, each of which may contain computer executable instructions executed by the processor 220 to perform functions relating to the novel techniques described herein to perform local repair for traffic sent over an MS-PW, such that the traffic can be re-routed rapidly in response to failure of a Switching PE (S-PE). That is, the embodiments described herein provide fast switchover of traffic from one PW Segment to another PW Segment on the path of a Multi-Segment PW (MS-PW).

Operationally, assume as shown in FIG. 1 that there are one or more MS-PWs running from terminating PE (T-PE) 1 to T-PE 2 and S-PE1 and S-PE3 are switching PEs (S-PEs) for the MS-PWs. Also, as noted, S-PE 1 and S-PE 2 may communicate according to an inter-chassis communication (ICC) protocol (e.g., an ICC session), as well as S-PE 3 and S-PE 4.

Figure 3:
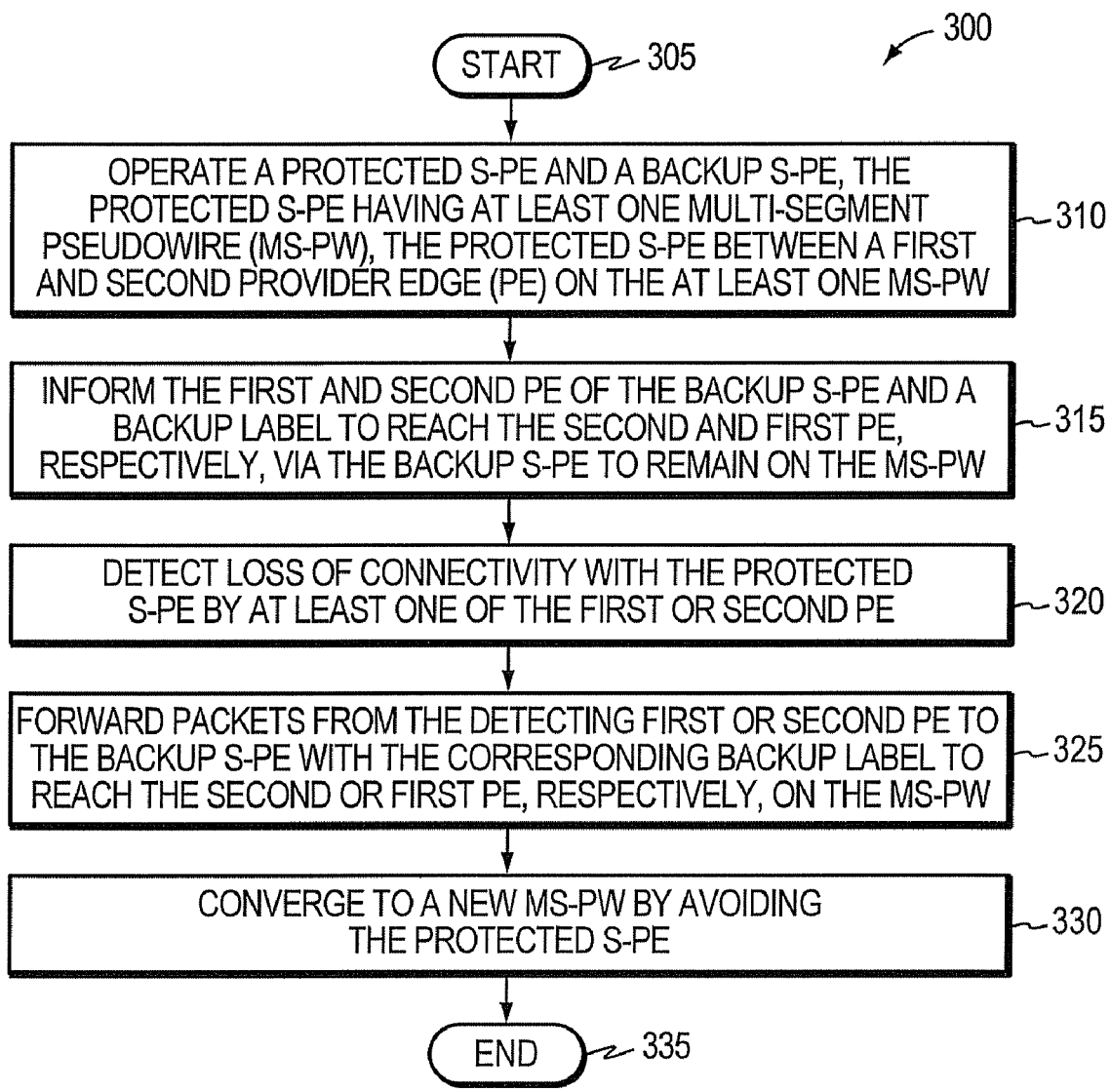
FIG. 3 illustrates an example procedure for restoring MS-PWs after failure of a switching PE.
Figure 4:
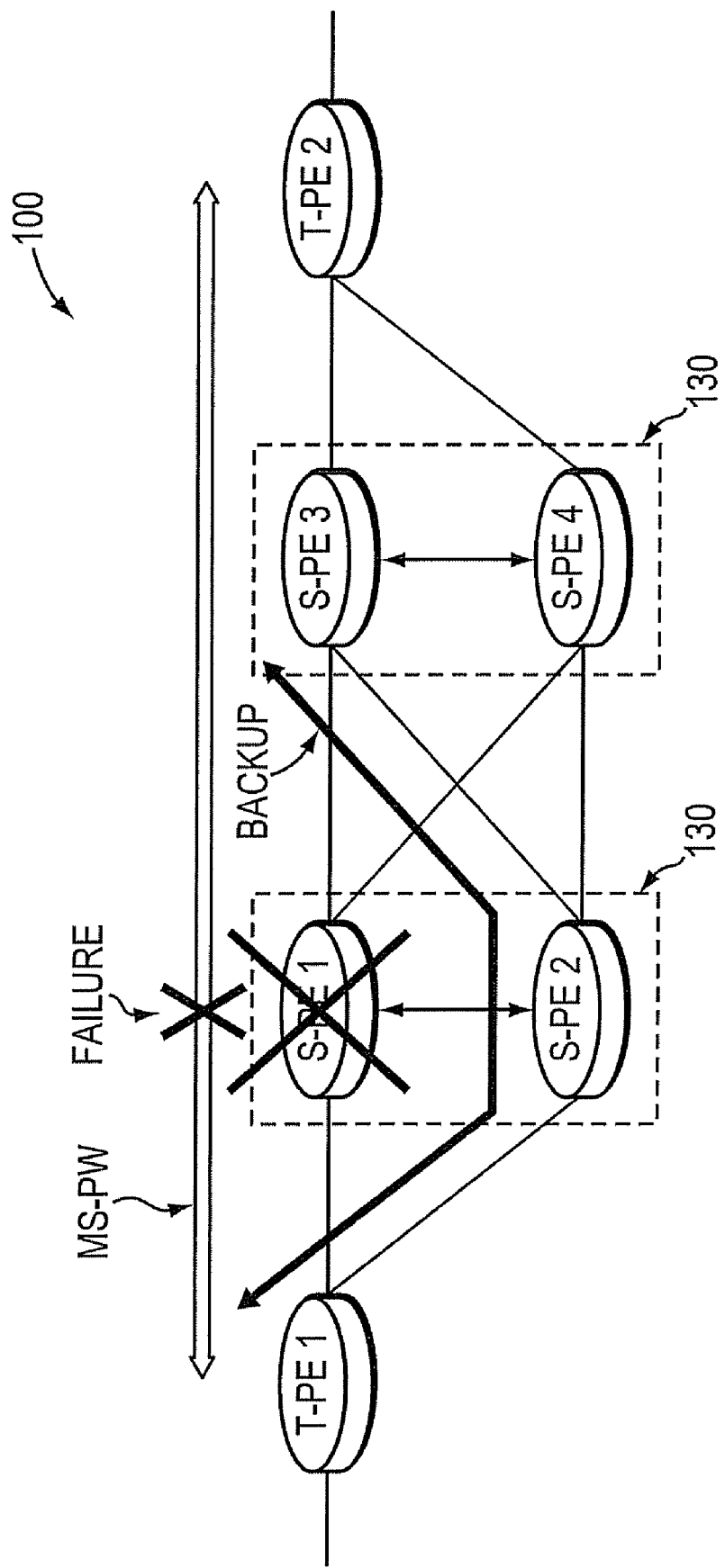
FIG. 4 illustrates an example network having a failed switching PE.

Generically, the embodiments described herein function according to the following procedure, as outlined in FIG. 3. Basically, the procedure 300 of FIG. 3 starts at step 305, and continues to step 310, where a protected S-PE and a backup S-PE are operated, e.g., S-PE 1 and S-PE 2, respectively, between a first and second PE (e.g., T-PE 1 and S-PE 3) on at least one MS-PW. (Note that the techniques described herein may be implemented at each segment of an MS-PW, not merely the first, as shown for illustration herein.) In step 315, the first and second PE may be informed of the backup S-PE and a backup label to reach the second and first PE, respectively, via the backup S-PE to remain on the MS-PW (this is described in more detail below). Once loss of connectivity with the protected S-PE is detected in step 320 by at least one of the first or second PE (e.g., through a connectivity verification protocol, such as bi-directional forwarding detection, or "BFD"), then in step 325 packets are forwarded from the detecting first or second PE to the backup S-PE with the corresponding backup label to reach the second or first PE, respectively, on the MS-PW. FIG. 4 illustrates the example network of FIG. 1 showing a switchover between T-PE 1 and S-PE 3 via the backup S-PE 2 upon failure of protected S-PE 1.

In addition, when a failure happens at S-PE1, the failure may be propagated from all S-PEs to T-PEs of the MS-PWs on the failed device (e.g., a new PW status notification error flag). In the above example, when T-PE 1 and T-PE 2 receive the new status message, T-PE 1 and T-PE 2 may establish a new MS-PW avoiding the failed S-PE (e.g., a make-before-break re-route process). Accordingly, in step 330, the network (e.g., the T-PEs) may converge to a new MS-PW by avoiding the protected S-PE, and the generic multi-segment failure restoration procedure 300 ends in step 335.

Notably, according to the embodiments described herein, the above generic procedure 300 of FIG. 3 for performing local repair on an MS-PW due to failure of an S-PE may be expanded to provide specific implementations according to three aspects described below with reference to FIGS. 5-7. In other words, FIG. 3 represents a baseline procedure 300 to which more specifically described aspects may be applied according to the embodiments demonstrated in FIGS. 5-7 below.

Figure 5:
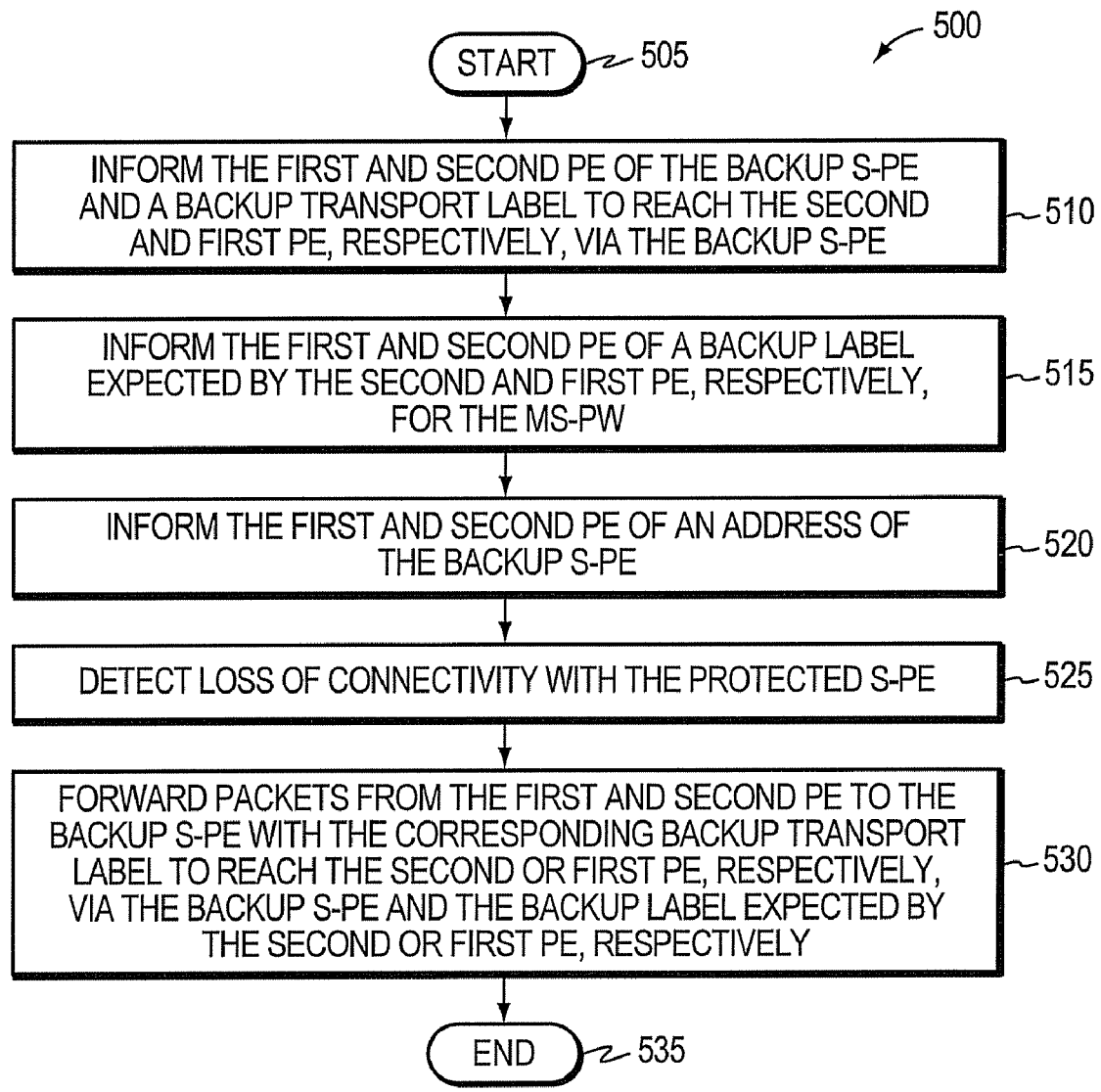
FIG. 5 illustrates another example procedure for restoring MS-PWs after failure of a switching PE.

For instance, FIG. 5 illustrates a first example expanded procedure 500 according to a first aspect (option) of the embodiments herein. The procedure 500 starts at step 505, and continues to step 510, where the first and second PE (e.g., T-PE 1 and S-PE 3) are informed of the backup S-PE 2 along with a backup transport label to reach the second and first PE, respectively, via the backup S-PE. For example, over the illustrative ICC session, S-PE 2 may send S-PE 1 a backup transport label to be used for T-PE 1 and S-PE 3. In step 515, the first and second PE may also be informed of a backup label expected by the second and first PE, respectively, for the MS-PW, and in step 520 may further be informed of the address of the backup S-PE.

In other words, in this option, S-PE 1 passes the following additional information to T-PE 1 when sending a PW label binding message:

(1) the backup transport label to reach S-PE 3 via S-PE 2;
(2) the backup label that S-PE 3 is expecting for the PW; and
(3) the IP address of the bypass node (S-PE 2).

Furthermore, S-PE 1 also passes the following additional information to S-PE 3 when sending a PW label binding message:

(1) the backup transport label to reach T-PE 1 via S-PE 2;
(2) the backup label that T-PE 1 is expecting for the PW; and
(3) the IP address of the bypass node (S-PE 2).

In step 525, in response to detecting loss of connectivity with the protected S-PE, each detecting PE in step 530 may forward packets to the backup S-PE 2 with the corresponding backup transport label to reach the other PE via the backup S-PE and the backup label expected by the other PE. That is, when T-PE 1 loses connectivity to S-PE 1, it forwards the packets to S-PE 2 with the backup PW label that S-PE 3 expecting and the corresponding backup transport label. Also, when S-PE 3 loses connectivity to S-PE 1, then it forwards the packets to S-PE 2 with the backup PW label that T-PE 1 expecting and the corresponding backup transport label. In this manner, the backup S-PE 2 does not need to know the PW label for the first and second PEs, and merely label switches packets to the respective other PE as told to do so by the label stack of the packets. In particular, S-PE 2 does not maintain state per PW, and merely performs a label switch based on the backup transport "tunnel" to deliver the packets to S-PE 3 or to T-PE 1. The first example expanded procedure 500 may then end in step 530, where by sending appropriate transport tunnel labels as well as the PW labels that the next hop expects, local repair can be provided with respect to S-PE failure, accordingly.

Figure 6:
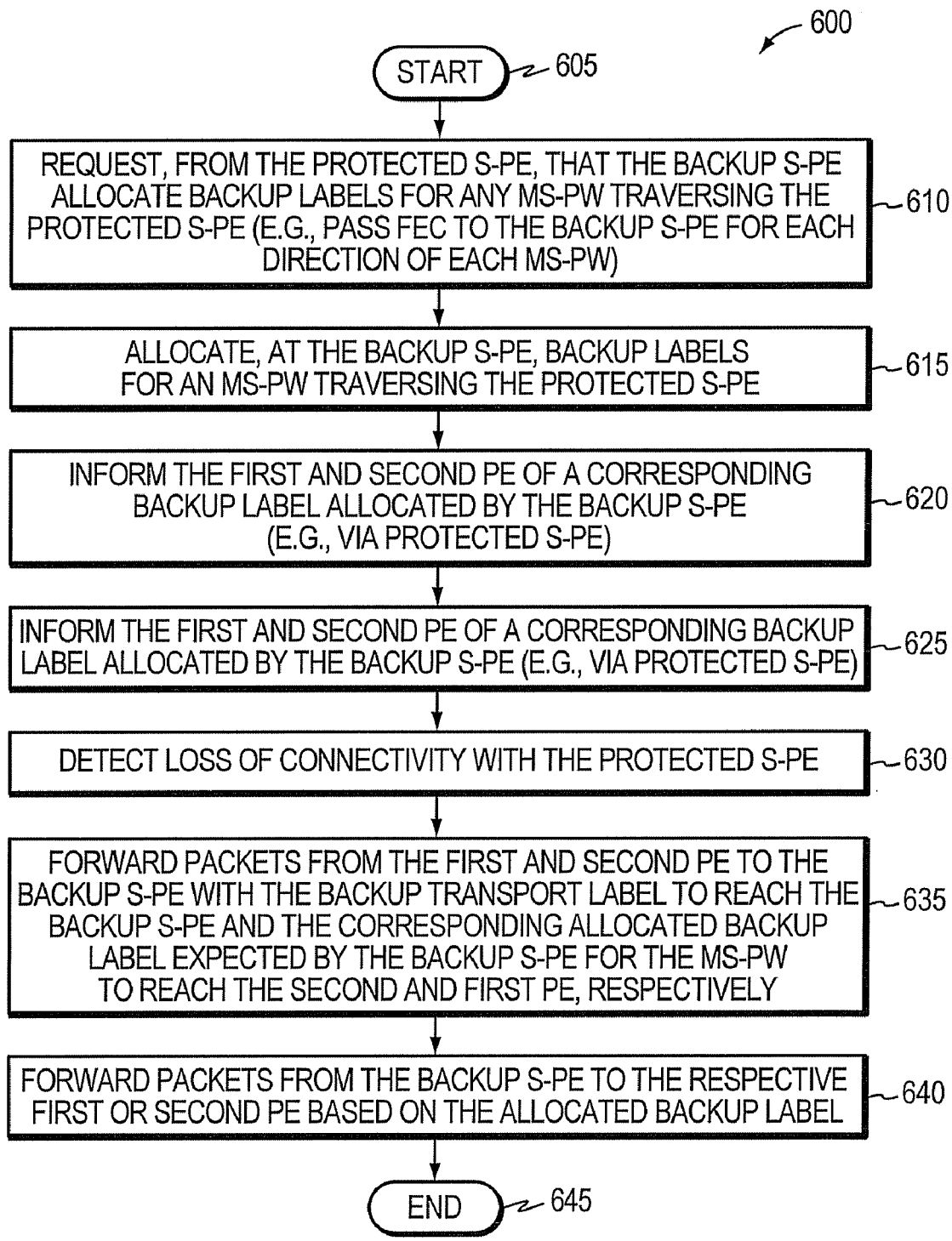
FIG. 6 illustrates another example procedure for restoring MS-PWs after failure of a switching PE.

FIG. 6 illustrates a second example expanded procedure 600 that may be used to restore MS-PWs in response to an S-PE failure. Unlike the first option (procedure 500), this second aspect/option assumes that the backup S-PE (e.g., S-PE2) maintains per PW state. In particular, the procedure 600 starts at step 605, and continues to step 610, where the protected S-PE 1 requests that the backup S-PE 2 allocate the backup labels for the MS-PWs traversing the protected S-PE. For example, to achieve this, S-PE 1 may pass a forwarding equivalency class (FEC) to the backup S-PE 2 for each direction of each MS-PW passing via S-PE 1, for example, i) S-PE 3, PW-ID, and S-PE 3 PW label, and ii) T-PE 1, PW-ID, T-PE 1 label, as may be appreciated by those skilled in the art. In this scheme, the protected S-PE 1 and backup S-PE 2 exchange the labels that they are using for the PWs in the redundancy group (e.g., in the chassis 130).

Accordingly, for each PW going through S-PE 1, S-PE 2 allocates backup PW label in step 615 to be used by T-PE 1 to go via S-PE 2 when S-PE 1 fails and another backup PW label to be used by S-PE 3 to go via S-PE 2 when S-PE 1 fails. (Illustratively, these labels may be transmitted over the ICC channel/session). As such, the backup S-PE 2 maintains a certain degree of state, having allocated labels (e.g., stored in label structure 249). Upon receiving the backup PW labels from the backup S-PE2, the protected S-PE1 may pass these labels to T-PE 1 and S-PE 3 along with the PW binding information, thus informing the first and second PE of the corresponding backup label allocated by the backup S-PE in step 620, and informing them of a backup transport label to reach the backup S-PE 2 in step 625.

In response to detecting loss of connectivity with the protected S-PE in step 630, each PE (T-PE 1 and S-PE 3) may forward packets in step 635 to the backup S-PE 2 with the backup transport label to reach the backup S-PE 2 and the corresponding allocated backup label expected by the backup S-PE 2 for the MS-PW to reach the other PE. That is, when T-PE 1 loses connectivity to S-PE 1, it sends the packets to S-PE 2 with the backup PW label that S-PE 2 is expecting (to forward to S-PE 3) and S-PE2's transport label, while when S-PE 3 loses connectivity to S-PE 1, it sends the packets to S-PE 2 with the backup PW label that S-PE 2 is expecting (to forward to T-PE 1) and S-PE2's transport label.

In step 640, when S-PE 2 receives the packets from T-PE 1, it sends/forwards the packet to S-PE 3 (based on the allocated backup label) with the PW label that S-PE 3 is expecting and a transport label to reach S-PE 3, while when S-PE 2 receives the packets from S-PE 3, it sends/forwards the packet to T-PE 1 (based on the allocated backup label) with the PW label that T-PE 1 is expecting and a transport label to reach T-PE 1. The second MS-PW restoration procedure 600 then ends in step 645.

Figure 7:
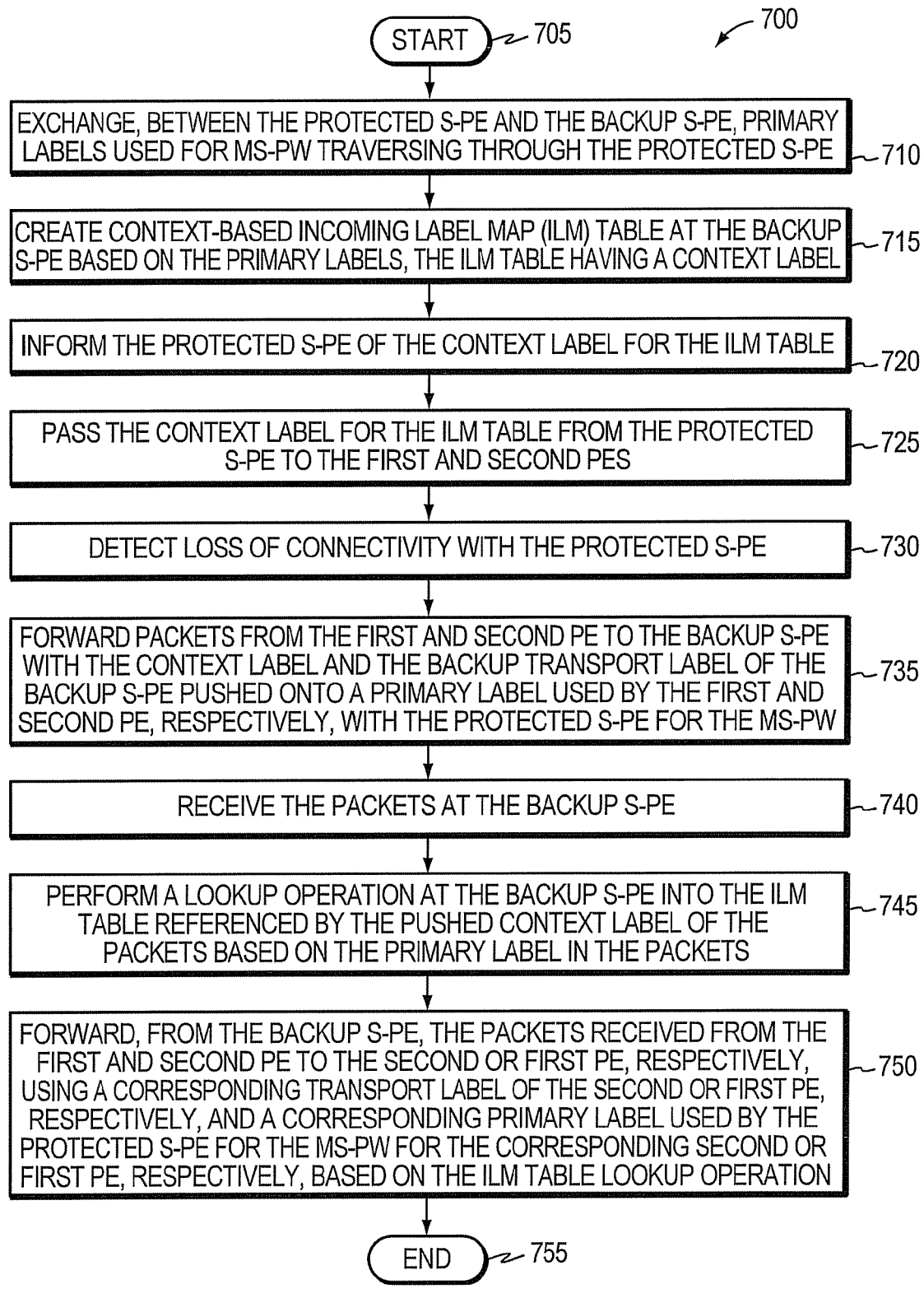
FIG. 7 illustrates another example procedure for restoring MS-PWs after failure of a switching PE.

With reference to FIG. 7, the third aspect/option of the embodiments herein is described through the illustrated example expanded third procedure for MS-PW restoration. In particular, in this context-based third scheme, S-PE 1 and S-PE 2 may exchange the labels that they are using for all the PWs going through them, in the redundancy group (e.g., chassis 130). Thus, the procedure 700 starts at step 705, and continues to step 710, where primary labels used for the MS-PWs traversing through the protected S-PE are exchanged with the backup S-PE (e.g., and vice versa to protect the backup S-PE, if desired). Then, in step 715, the backup S-PE 2 may create/build a context-based incoming label map (ILM) table 800 based on the primary labels for all the PW labels it receives from the protected S-PE 1 that may be used to send PW packets to either T-PE 1 or S-PE 3 (described below).

FIG. 8 illustrates an example ILM table 800 which may be used in accordance with this third aspect of the embodiments described herein. In particular, the illustrative table has a context label 810 and comprises one or more entries 870, each having a plurality of fields to store the relevant information. Specifically, an MS-PW ID field 820 may indicate each MS-PW of the protected S-PE 1, while a directional context field 830 may optionally be used to provide details regarding the corresponding incoming label field 840 (e.g., on which incoming port the labels in field 840 have relevance). Further, the incoming label fields 840 (e.g., labels A-D) may be mapped to outgoing label field 850 (e.g., labels W-Z), and transport label field 860 (optionally within the table 800) provides the transport label that is to be appended to the outgoing label 850 to complete the switchover. Also, the context label 810 (e.g., a redundancy context label or "RCL") may be used to represent this particular ILM table 800, in order to provide a context for any lookup operations to be performed on ILM tables in general at the backup S-PE. (Those skilled in the art will understand that the illustrative table 800 is merely representative, and that more or fewer fields may be present, and that the fields in general may be arranged differently, so long as the incoming labels are mapped to the outgoing labels, as described herein.)

Referring again to procedure 700 of FIG. 7, the backup S-PE 2 may inform the protected S-PE 1 of the context label 810 for the ILM table 800 in step 720, and in step 725, the protected S-PE 1 may pass the context label to the first and second PEs (T-PE 1 and S-PE 3), for example, as a parameter to the FEC for each covered PW, as may be appreciated by those skilled in the art.

Accordingly, in response to detecting loss of connectivity with the protected S-PE in step 730, the first and second PE may forward packets in step 735 to the backup S-PE 2 with the context label 810 and the backup transport label of the backup S-PE 2 pushed onto a primary label used by the first and second PE, respectively, with the protected S-PE for the MS-PW. In other words, in order to re-route PW traffic via S-PE 2 due to failure of S-PE 1, T-PE 1 or S-PE 3 adds the S-PE 1 PW label, and then pushes the context label 810 as well as its own transport label to reach S-PE 2 onto the original traffic (i.e., not removing the labels S-PE 1 originally expected). Thus, the three labels on the packets are the PW label the protected S-PE 1 used to expect, the context label for the particular table 800 at the backup S-PE 2, and the transport label for the backup S-PE 2.

The backup S-PE 2 may then receive the packets in step 740, and in step 745 performs a lookup operation into the ILM table 800 referenced by the pushed context label 810 of the packets. The lookup operation is based on the primary label in the packets (e.g., a lookup into incoming label field 440), thus allowing the backup S-PE2 to determine a corresponding outgoing label 450 that the protected S-PE 1 would have originally included in the outgoing packets. Accordingly, in step 750, the packets coming from T-PE 1 are forwarded to S-PE 3 with the PW label that S-PE 3 is expecting and the transport label to reach S-PE 3, while the same is done for the reverse direction as well, i.e., from S-PE 3 to T-PE 1. The third expanded MS-PW restoration procedure 700 ends in step 755. (Notably, each procedure 500, 600, and 700 may further comprise the step 330 of converging to a new set of MS-PWs, accordingly, and the steps shown are merely representative of the correspondingly specific expansions for the different aspects/options described herein.)

Advantageously, therefore, the novel techniques described herein restore MS-PWs after failure of an S-PE in a computer network. Through each of the specific embodiments described above, the novel techniques provide the ability to quickly switchover any PW segment in a MS-PW by performing local repair and switching the PW segment traffic quickly to a backup node. In particular, the techniques described above provide resiliency at the PW L2VPN overlay network that is substantially comparable to the resiliency at the transport or Layer 1 network. Also, by propagating the failure across all segments of the MS-PW, the T-PE may re-signal an alternate MS-PW that avoids the failure point. Further, the dynamic aspects of one or more embodiments described herein alleviate the need for cumbersome and inefficient manual configuration.

In addition, to further decrease the time required for responding to a failure of an S-PE (e.g., a switchover time), the first and second PEs (e.g., T-PE 1 and S-PE 3) may arrange their forwarding information databases (FIBs) to have a data structure for S-PE 1 (a level of indirection) that points to the labels all PWs going through S-PE 1. That is, T-PE 1 and S-PE 3 may pre-program their FIB data plane such that each PW (MS-PW) going to S-PE 1 is associated with the backup PW label and the backup transport label. Accordingly, upon detecting failure of S-PE 1, a single update is used to trigger the first and second PEs to start forwarding all the MS-PW traffic with the backup label and transport label to reach S-PE 2, as described above. That is, in response to detecting the loss of connectivity with the protected S-PE 1, the first and second PEs may quickly point to labels used for the backup S-PE for the MS-PW within their FIBs instead of the original labels. (In other words, rather than changing all of the labels within the FIBs, the FIBs merely contain pointers to data structures that contain the actual labels. When a failure occurs, the pointer is quickly changed to a backup data structure containing the backup labels, as may be appreciated by those skilled in the art.)

While there have been shown and described illustrative embodiments that restore MS-PWs after failure of an S-PE in a computer network, it is to be understood that various other adaptations and modifications may be made within the spirit and scope of the present invention. For example, the embodiments have been shown and described herein using certain messages, message formats, and communication protocols. However, the embodiments of the invention in their broader sense are not so limited, and may, in fact, be used with alternate embodiments that remain within the scope of the appended claims as will be understood by those skilled in the art, accordingly.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
operating a protected switching provider edge (S-PE) and a backup S-PE, the protected S-PE having at least one multi-segment pseudowire (MS-PW), the protected S-PE located between a first and second provider edge (PE) on the at least one MS-PW;
informing the first and second PE of the backup S-PE and a backup transport label to reach the second and first PE, respectively, via the backup S-PE;
informing the first and second PE of a backup label expected by the second and first PE, respectively, for the MS-PW;
informing the first and second PE of an address of the backup S-PE;
detecting loss of connectivity with the protected S-PE by at least one of the first or second PE; and
in response to detecting loss of connectivity with the protected S-PE, forwarding packets from the first and second PE to the backup S-PE with the corresponding backup transport label to reach the second or first PE, respectively, via the backup S-PE and the backup label expected by the second or first PE, respectively.

2. A method, comprising:
operating a protected switching provider edge (S-PE) and a backup S-PE, the protected S-PE having at least one multi-segment pseudowire (MS-PW), the protected S-PE located between a first and second provider edge (PE) on the at least one MS-PW;
allocating, at the backup S-PE, backup labels for the MS-PW traversing the protected S-PE;
informing the first and second PE of a corresponding backup label allocated by the backup S-PE;
informing the first and second PE of a backup transport label to reach the backup S-PE;
detecting loss of connectivity with the protected S-PE by at least one of the first or second PE; and
in response to detecting loss of connectivity with the protected S-PE, forwarding packets from the first and second PE to the backup S-PE with the backup transport label to reach the backup S-PE and the corresponding allocated backup label expected by the backup S-PE for the MS-PW to reach the second and first PE, respectively.

3. The method as in claim 2, further comprising:
requesting, from the protected S-PE, that the backup S-PE allocate the backup labels for at least one of the MS-PWs traversing the protected S-PE.

4. The method as in claim 3, further comprising:
passing a forwarding equivalency class (FEC) from the protected S-PE to the backup S-PE for each direction of each MS-PW.

5. The method as in claim 2, further comprising:
informing the protected S-PE of the backup labels allocated by the backup S-PE, wherein the protected S-PE informs the first and second PE of the corresponding labels.

6. A method, comprising:
operating a protected switching provider edge (S-PE) and a backup S-PE, the protected S-PE having at least one multi-segment pseudowire (MS-PW), the protected S-PE located between a first and second provider edge (PE) on the at least one MS-PW;
exchanging, between the protected S-PE and the backup S-PE, primary labels used for at least one of the MS-PWs traversing through the protected S-PE;
creating a context-based incoming label map (ILM) table at the backup S-PE based on the primary labels, the ILM table having a context label;
informing the protected S-PE of the context label for the ILM table;
passing the context label for the ILM table from the protected S-PE to the first and second PEs;
detecting loss of connectivity with the protected S-PE by at least one of the first or second PE;
in response to detecting loss of connectivity with the protected S-PE, forwarding packets from the first and second PE to the backup S-PE with the context label and the backup transport label of the backup S-PE pushed onto a primary label used by the first and second PE, respectively, with the protected S-PE for the MS-PW;
receiving the packets at the backup S-PE;
performing a lookup operation at the backup S-PE into the ILM table referenced by the pushed context label of the packets based on the primary label in the packets; and
forwarding, from the backup S-PE, the packets received from the first and second PE to the second or first PE, respectively, using a corresponding transport label of the second or first PE, respectively, and a corresponding primary label used by the protected S-PE for the MS-PW for the corresponding second or first PE, respectively, based on the ILM table lookup operation.

7. The method as in claim 1, further comprising:
converging to a new MS-PW by avoiding the protected S-PE.

8. The method as in claim 1, further comprising:
detecting loss of connectivity through a connectivity verification protocol.

9. The method as in claim 1, further comprising:
pointing, within a forwarding information database (FIB) at the first and second PE, to labels used for the protected S-PE for the MS-PW; and
in response to detecting the loss of connectivity with the protected S-PE, pointing to labels used for the backup S-PE for the MS-PW.

10. The method as in claim 1, further comprising:
communicating between the protected S-PE and the backup S-PE according to an inter-chassis communication (ICC) protocol.

11. A system, comprising:
a protected switching provider edge (S-PE), the protected S-PE having at least one multi-segment pseudowire (MS-PW);

a first and second provider edge (PE), the protected S-PE located between the first and second PE on the at least one MS-PW; and a backup S-PE;

wherein the first PE is configured to:
  receive an address of the backup S-PE,
  receive a backup transport label to reach the second PE via the backup S-PE,
  receive a backup label expected by the second PE for the MS-PW,
  detect loss of connectivity with the protected S-PE, and
  forward packets to the backup S-PE in response to a detected loss of connectivity with the protected S-PE, the forwarded packets having the backup transport label to reach the second PE via the backup S-PE and the backup label expected by the second PE for the MS-PW.

12. A system, comprising:

a protected switching provider edge (S-PE), the protected S-PE having at least one multi-segment pseudowire (MS-PW);

a first and second provider edge (PE), the protected S-PE located between the first and second PE on the at least one MS-PW; and a backup S-PE;

wherein the backup S-PE is configured to allocate backup labels for the MS-PW traversing the protected S-PE, and wherein the first PE is configured to:
  receive an address of the backup S-PE,
  receive a backup transport label to reach the backup S-PE,
  receive a backup label allocated by the backup S-PE to reach the second PE to remain on the MS-PW,
  detect loss of connectivity with the protected S-PE, and
  forward packets to the backup S-PE in response to a detected loss of connectivity with the protected S-PE, the forwarded packets having the backup transport label to reach the backup S-PE and the allocated backup label expected by the backup S-PE for the MS-PW to reach the second PE.

13. A system, comprising:

a protected switching provider edge (S-PE), the protected S-PE having at least one multi-segment pseudowire (MS-PW);

a first and second provider edge (PE), the protected S-PE located between the first and second PE on the at least one MS-PW; and a backup S-PE;

wherein the protected S-PE is further configured to inform the backup S-PE of primary labels used for at least one of the MS-PWs traversing through the protected S-PE, wherein the backup S-PE is configured to create a context-based incoming label map (ILM) table based on the primary labels, the ILM table having a context label, and to inform the protected S-PE of the context label for the ILM table, wherein the protected S-PE is further configured to pass the context label for the ILM table from the protected S-PE to the first and second PEs, wherein the first and second PEs are further configured to forward, in response to detecting loss of connectivity with the protected S-PE, packets to the backup S-PE with the context label and the backup transport label of the backup S-PE pushed onto a primary label used by the first and second PE, respectively, with the protected S-PE for the MS-PW, and wherein the backup S-PE is further configured to receive the packets, perform a lookup operation into the ILM table referenced by the pushed context label of the packets based on the primary label in the packets, and forward the packets received from the first and second PE to the second or first PE, respectively, using a corresponding transport label of the second or first PE, respectively, and a corresponding primary label used by the protected S-PE for the MS-PW for the corresponding second or first PE, respectively, based on the ILM table lookup operation.

14. An apparatus, comprising:

one or more network interfaces configured to communicate on at least one multi-segment pseudowire (MS-PW) through a protected switching provider edge (S-PE) to a second provider edge (PE);

one or more network interfaces configured to communicate with a backup switching PE (S-PE);

a processor coupled to the network interfaces and configured to execute one or more processes; and a memory configured to store a process executable by the processor, the process when executed operable to:
  receive an address of the backup S-PE;
  receive a backup transport label to reach the second PE via the backup S-PE;
  receive a backup label expected by the second PE for the MS-PW;
  detect loss of connectivity with the protected S-PE; and
  forward packets to the backup S-PE in response to a detected loss of connectivity with the protected S-PE, the forwarded packets having the backup transport label to reach the second PE via the backup S-PE and the backup label expected by the second PE for the MS-PW.

15. The apparatus as in claim 14, wherein the process receives the address of the backup S-PE, the backup label to reach the second PE via the backup S-PE, and the backup transport label expected by the second PE for the MS-PW from the protected S-PE.

16. An apparatus, comprising:

one or more network interfaces configured to communicate on at least one multi-segment pseudowire (MS-PW) through a protected switching provider edge (S-PE) to a second provider edge (PE);

one or more network interfaces configured to communicate with a backup switching PE (S-PE);

a processor coupled to the network interfaces and configured to execute one or more processes; and a memory configured to store a process executable by the processor, the process when executed operable to:
  receive an address of the backup S-PE;
  receive a backup transport label to reach the backup S-PE;
  receive a backup label allocated by the backup S-PE to reach the second PE to remain on the MS-PW;
  detect loss of connectivity with the protected S-PE; and
  forward packets to the backup S-PE in response to a detected loss of connectivity with the protected S-PE, the forwarded packets having the backup transport label to reach the backup S-PE and the allocated backup label expected by the backup S-PE for the MS-PW to reach the second PE.

17. The apparatus as in claim 16, wherein the process receives the address of the backup S-PE, the backup transport label to reach the backup S-PE, and the backup label allocated by the backup S-PE to reach the second PE to remain on the MS-PW from the protected S-PE.

18. An apparatus, comprising:

one or more network interfaces configured to communicate with a protected switching provider edge (S-PE) and a first and second provider edge (PE), the protected S-PE having at least one multi-segment pseudowire (MS-PW), the protected S-PE between the first and second PE on the at least one MS-PW;

a processor coupled to the network interfaces and configured to execute one or more processes; and a memory configured to store a process executable by the processor, the process when executed operable to:

receive, from the protected S-PE, primary labels used for at least one of the MS-PWs traversing through the protected S-PE;

create a context-based incoming label map (ILM) table based on the primary labels, the ILM table having a context label;

inform the protected S-PE of the context label for the ILM table;

receive, from the first PE, packets with the context label pushed onto a primary label used by the first PE with the protected S-PE for the MS-PW;

perform a lookup operation into the ILM table referenced by the pushed context label of the packets based on the primary label in the packets; and forward the packets received from the first PE to the second PE using a corresponding transport label of the second and a corresponding primary label used by the protected S-PE for the MS-PW for the second PE based on the ILM table lookup operation.

* * * * *